Figure 1:
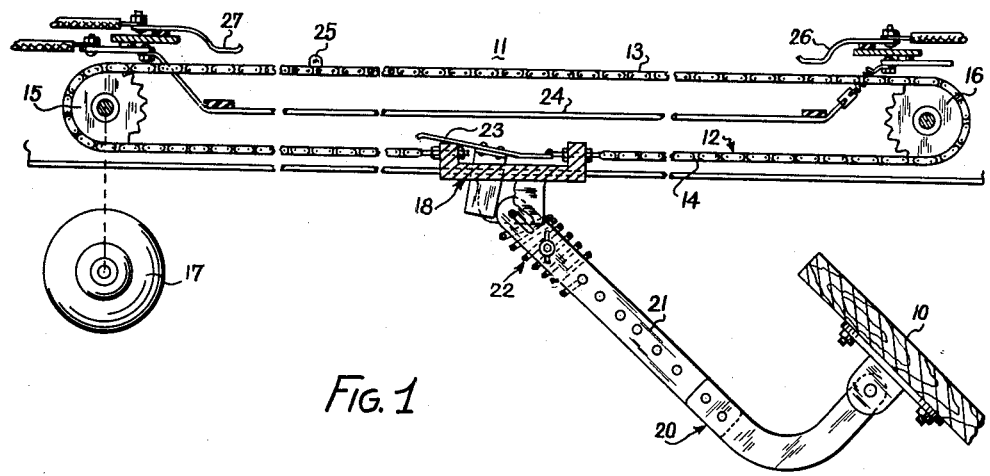

April 27, 1965

W. KLAMP 3,181,049

DOOR OPERATOR MOTOR CONTROL

Filed Dec. 15, 1959

2 Sheets-Sheet 1

INVENTOR.
WILLIAM KLAMP
BY Hudson, Boughton,
Williams, David & Hoffmann
ATTORNEYS April 27, 1965  W. KLAMP  3,181,049

DOOR OPERATOR MOTOR CONTROL

Filed Dec. 15, 1959  2 Sheets-Sheet 2

INVENTOR.
WILLIAM KLAMP
BY Hudson, Boughton,
Williams, David & Hoffmann
ATTORNEYS

United States Patent Office 3,181,049
Patented Apr. 27, 1965

3,181,049
DOOR OPERATOR MOTOR CONTROL
William Klamp, Rocky River, Ohio, assignor to Cleveland Detroit Corporation, Cleveland, Ohio, a corporation of Ohio
Filed Dec. 15, 1959, Ser. No. 859,654
10 Claims. (Cl. 318—267)

The present invention relates to door or closure operators and, more particularly, to a control system therefor.

Door or closure operators are used primarily to open and close garage doors, although suitable for other uses, such as opening and closing the gates of canal locks.

Door or closure operators may comprise a carriage which is secured to an endless chain which is driven in one direction to move the carriage to close the door and in the opposite direction to move the carriage to open the door, the carriage operating along one run of the chain to open and close the door.

In control systems for closures, such as overhead garage doors, it is desirable that the control system for the operator be such that switches for controlling the operator from various points may be readily incorporated into the control circuit. Furthermore, it is desirable that the direction of operation of the operator cannot be reversed once it starts its door opening movement and such that, if open and close control switches are actuated simultaneously, the door will move in an open direction. In addition, it is preferable, when the door is in its open or closed position, that the motor for opening and closing the door cannot be operated in any direction except the direction necessary to move the door to its other position.

In general, it might be said that a desideratum of a control system for a door operator is that the operator be foolproof to such an extent that regardless of the manner of operation of the control switches therefore, the operator cannot be damaged or the door cannot be closed when it has been operated to permit an object to pass therethrough.

A principal object of the present invention is to provided a door operator which will have the advantages of the desiderata described above.

Another object of the present invention is to provide a new and an improved control system for an operator for opening and closing a door or other closure and wherein control switches may be readily and easily added to the system to effect control of the operator from various points, the system being such that the closure operator will operate in an open direction whenever an open switch is depressed and regardless of the condition of the close switch or switches, and such that the direction of operation of the system cannot be changed from open to close while the operator is operating in an open direction but can be changed from close to open when operating in a close direction.

Another object of the present invention is to provide a control system for an actuator for reciprocating a member such as a door or closure between limit positions of the type wherein a control relay is effectively short-circuited to stop the operation of the actuator when the member is in either of its limit positions and which is so arranged that the short circuit need not be broken to effect operation of the actuator to move the member from its immediate limit position to its other limit position.

A further object of the present invention is to provide a novel and improved, simplified reversing system for reversing a split phase type motor energized from a single phase power supply and having a run winding, and a start winding that is energized to start or reverse the motor, but which is de-energized after the motor starts, and in which the motor is reversed by reversing the connections of the run winding to the power supply, and the start winding is energized in response to the current surge in the run winding when its connections are reversed to effect a reversing of the motor.

In accordance with the present invention, the closure operator, or other operator for reciprocating a member between limit positions, is controlled by an open relay and by a close relay, with the respective relays being energized to effect operation of the operator in the direction necessary to open and close the closure, respectively. The relays are energized by a low voltage circuit and when the operator arrives at either of its open or close limit positions, a circuit is completed to effectively short-circuit the corresponding relay to drop out the relay and stop the operation of the operator. The circuit for energizing the motor of the operator to operate in a close direction includes normally closed contacts of the relay energized to operate the closure in an open direction. This prevents operation of the motor in a close direction whenever the open relay is energized. The open relay may be energizable by pushbutton switches or by the actuation of a safety relay which is energized whenever the door or closure meets an obstruction during its closing movement. Since the circuit operating the motor in a close direction includes normally closed contacts of the open relay, simultaneous depression of both the open and close buttons will only effect operation of the motor in an open direction.

Since two separate relays are provided for operating the closure in open and close directions, respectively, the short-circuit connection of one of the relays, when the operator arrives at the limit position in the direction which the motor operates when energized by the corresponding relay, does not need to be broken in order to operate the motor in the other direction. Each relay is maintained energized by self-holding contacts and the contacts open to break the circuit when the operator reaches the limit position and the short circuit effects a dropping out of the relay. The use of two relays together with the interlocking of the motor control circuit so that it cannot operate in a close direction when the open relay is energized, makes it feasible to merely parallel control switches at various locations for effecting energization of the open and close relays.

Further in accordance with the present invention, a split phase motor of the type having a single phase run winding and a start winding which is cut out when the motor starts is reversed to reverse the direction of motor operation, by reversing the connections of the run winding of the power supply and the surge of current in the run winding when the connections of the run winding are reversed is utilized to actuate a relay to close the start winding to effect a starting or reversing of the motor, the start winding always being energized by current flow in one direction.

Figure 2:
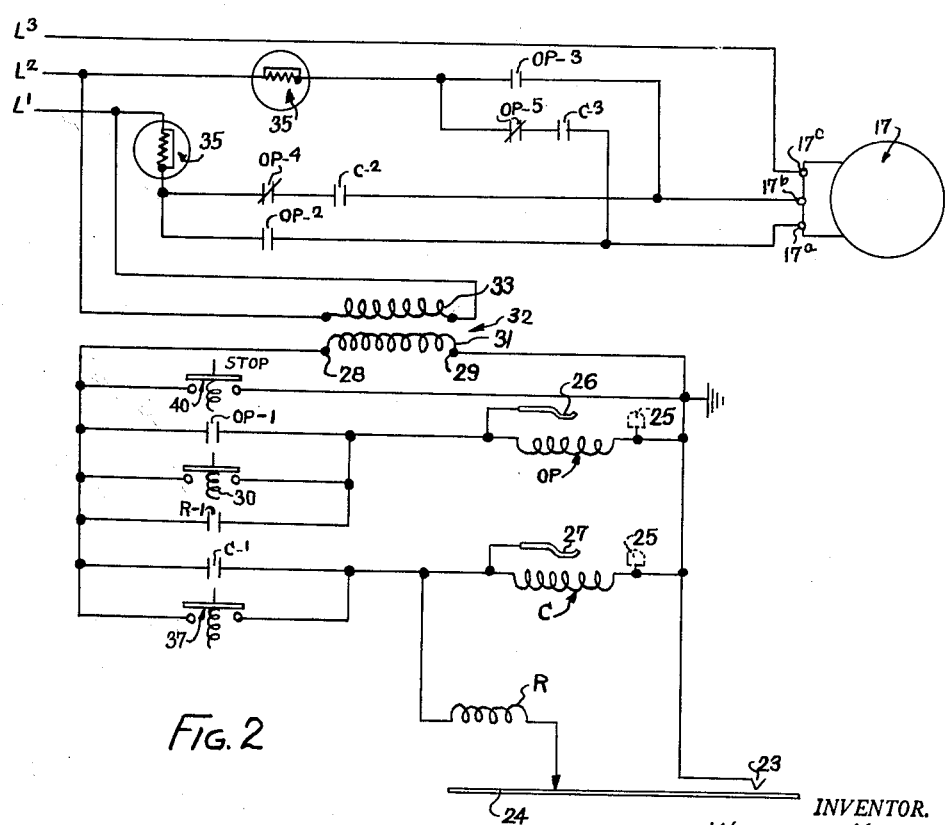
Figure 4:
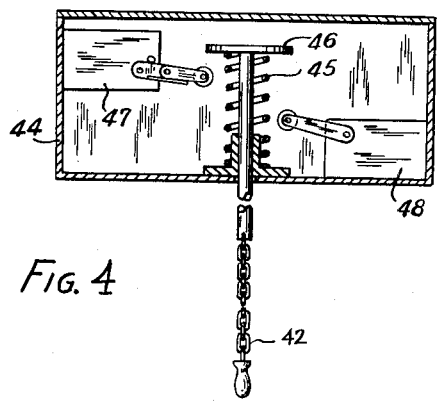
Figure 5:
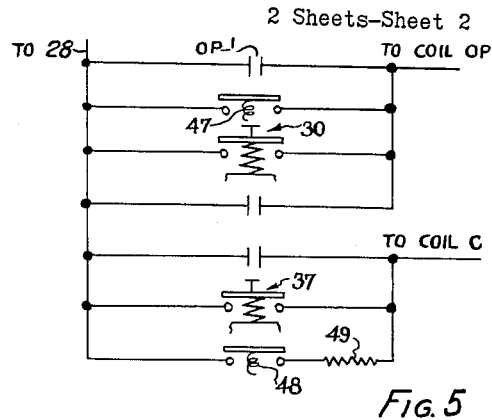
Figure 3:
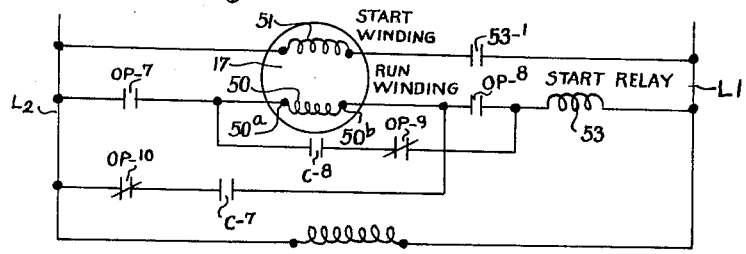
Figure 3:
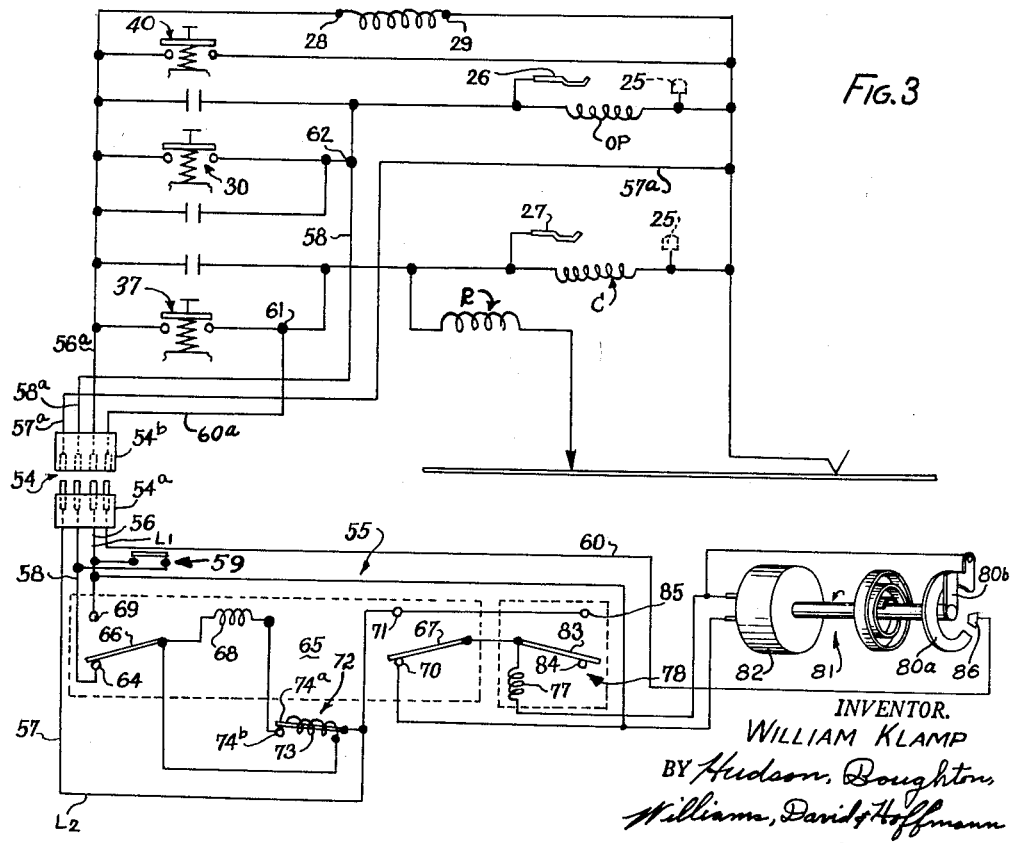

Further objects and advantages of the present invention will be apparent from the following description of the preferred embodiment thereof made with reference to the accompanying drawings forming a part of this specification and in which:

FIG. 1 is a diagrammatic view of a door operator for opening and closing an overhead door;
FIG. 2 is a schematic circuit diagram for controlling the operator of FIG. 1;
FIG. 3 is a modified circuit diagram;
FIG. 4 shows a switch mechanism which can be used with the operator of FIG. 1; and
FIG. 5 is a fragmentary circuit diagram including the switches of FIG. 4.

While the present invention is susceptible of various constructions and modifications and of use where it is desired to reciprocate a member between limit positions, which may be arbitrarily designated as opened and closed positions, it is particularly useful when embodied in an operator for opening and closing a door or other closure.

Referring to the drawings, the present invention is illustrated as embodied in an operator of the type shown and described in my Patent No. 2,887,311, issued May 19, 1959. The details of the operator will not be described since they are not believed necessary for an understanding of the present invention and in view of the fact that they are set forth in the aforesaid patent. Suffice it to say, that a door 10 is operated between open and close positions by a door operator 11 which includes and endless chain 12 having upper and lower runs 13, 14, respectively, and supported for movement through an endless path by spaced sprockets 15, 16. The sprocket 15 is secured to a shaft driven by a reversible motor 17 which is operated in one direction to open the door 10 and in the opposite direction to close the door 10. A carriage 18 is fixed to the lower run 14 of the chain 12. The carriage 18 is connected to the door 10 through a linkage 20 including a link 21 connected to the carriage 18 by a yieldable connection 22 which provides for relative movement between the carriage 18 and the link 21 when the door 10 meets an obstruction in its closing movement. This relative movement of the link 21 is effective to raise a spring finger 23 into engagement with a conductor 24 which extends parallel to the run 14 above the path of movement of the carriage 18 and which is electrically insulated from the chain 12 and carriage 18. The engagement of the spring finger 23 with the conductor 24 effects a circuit for reversing the direction of operation of the motor 17 as will be described hereinafter. The carriage 18, the connection 22, and the manner in which the spring finger 23 is moved into engagement with the conductor are fully described in the aforesaid patent and will not be repeated, since it does not, per se, form a part of this invention. For the purposes of this invention, it is sufficient to known that a circuit is completed when the door 10 meets an obstruction and the manner in which this circuit is completed may be as described above or may be accomplished in other known ways.

The upper run 13 of chain 12 has a limit lug 25 thereon which engages a leaf spring 26, which is supported at the right-hand end of the upper run and insulated from its support, when the motor 17 has been operated to move the carriage to the left to a position where the door 10 is fully opened and a leaf spring 27, which is supported at the left-hand end of the upper run 13 and which is insulated from its support, when the motor 17 has been operated to move the carriage 18 to the right to a position where the door 10 is closed. The engagement of the lug 25 with either the leaf spring 26 or the leaf spring 27 will de-energize the control circuit and the power circuit for the motor 17 in a manner to be described hereinafter.

Referring to FIG. 2, the motor 17 is shown as a three-phase motor, having terminals 17a, 17b, 17c, energized from A.C. power lines L1, L2, L3. In a three-phase motor, the direction of operation of the motor may be reversed by interchanging the connections of two of the phases to the motor. The control circuit for the motor 17, as shown in FIG. 2, includes an open relay comprising a relay coil OP and normally open holding contacts OP-1, normally open contacts OP-2, OP-3, and normally closed contacts OP-4, OP-5. The relay coil OP is energized by depressing a pushbutton switch 30 to connect the relay coil across terminals 28, 29 of a secondary coil 31 of a low voltage transformer 32 having a primary coil 33 connected across L1, L2. The terminal 29 of coil 31 may be grounded. The energization of the relay coil OP closes its normally open contacts OP-1, which are connected in parallel with the pushbutton switch 30 to effect a holding circuit for the relay coil OP, and normally open contacts OP-2, OP-3 to connect L1, L2, respectively, to motor terminals 17a, 17b, respectively, through overload devices 35 connected in each of the phases L1, L2, to the terminals 17a, 17b effects operation of the motor 17 in one direction. The overload devices 35 may be fuses or other devices which open the circuit when the current through the respective device reaches a predetermined magnitude.

The door 10 is operated in a close direction by energizing a close relay comprising a relay coil C and normally open holding contacts C-1 and normally open contacts C-2, C-3. The relay coil C is energized by depressing a pushbutton switch 37 to connect the relay coil C across the terminals 28, 29 of the secondary coil 31 of the transformer 32 and the energization of the relay coil closes normally open contacts C-1 to effect a holding circuit about the pushbutton switch 37, the normally open contacts C-2 to connect the motor terminal 17b to L1 through the normally closed contacts OP-4, and the normally open contacts C-3 to effect the connection of motor terminal 17a to L2 through the normally closed contacts OP-5 of the open relay. It will be seen that if the OP relay coil is deenergized, the energization of the relay coil C will connect the terminal 17a to L2 and the terminal 17b to L1 and that thus the connections of the terminals 17a, 17b to L1 and L2 are interchanged from what they are when the relay coil OP is energized. The motor 17, therefore, operates in the opposite direction to move the carriage 18 to close the door 10.

When the motor 17 is operated to open the door, the upper run of the chain is moved toward the right, as viewed in FIG. 1, and when the door is open, the lug 25 strikes the leaf spring 26. The lug 25 is connected to the side of relay coil OP connected to terminal 29 of the transformer 31, which may be considered ground, and the leaf spring 26 is connected to the other side of the coil OP so that the engagement of the lug 25 with the leaf spring 26 effects a short circuit across the relay coil OP to drop out the coil and open its contacts for controlling the energization of the motor 17. Similarly, when the motor is operating in a direction to close the door, the lug will engage the leaf spring 27 to effect a de-energization of the close relay coil C.

The leaf spring 23, when it engages the conductor 24, effects the energization of a relay coil R having one side connected to the conductor 24 and the other side connected to the side of the relay coil C which is connected to the terminal 28 of the secondary coil 31 through the holding contacts C-1. If the door is operating in a close direction, the relay coil C is energized through the closed holding contacts C-1 and one side of the relay coil R is, therefore, connected to the terminal 28; and if the spring finger 23 engages the conductor 24, the other side of relay coil R is grounded to energize the coil and close contacts R-1 which are connected in parallel with the pushbutton switch 30 and the holding contacts OP-1, to effect energization of the relay coil OP. Energization of the relay coil OP opens its normally closed contacts OP-5, OP-4 in series with the contacts C-2, C-3 of relay coil C in the power circuit for the motor 17 to disconnect the terminals 17b, 17a from L1, L2, respectively, to effect a reversing of the motor 17. It can be seen, therefore, that whenever the relay coil R is energized during door closing movement, the motor 17 will operate in a direction to open the door 10. Only a momentary energization of the relay coil R is required since the energization of the relay coil OP will close its contacts OP-1 and the motor will operate in an open direction until the lug 25 strikes the leaf spring 26.

The operation of the motor 17 can be stopped at any time by depressing a pushbutton switch 40. The pushbutton switch 40 completes a short circuit across the secondary coil 31 to drop out any of the energized coils OP, C and R.

It will be noted that the relay coil OP can remain short circuited when the motor 17 is in its open position to prevent operation of the motor in an open direction without interferring with the operation of the motor in a close direction. This is true because the relay coil C is not short-circuited and can be energized by depressing close pushbutton switch 37. This makes it unnecessary to provide safety clutches, etc., to assure that the motor is not overloaded by trying to operate the motor in the wrong direction when it is in a limit position. It will further be observed that the motor can be controlled from more than one point by merely paralleling pushbutton switches with the opening close pushbutton switches shown in FIG. 2. The circuit is so arranged that detrimental operation cannot occur even though a person at one of the locations pushes the close switch while the operator is opening the door or at the same time that a party in a different location pushes an open switch. In any case, the operator will continue to or start operating in an open direction and, if the operator has started in a close direction, the depression of an open pushbutton at any point will cause the operator to operate in an open direction. This prevents the closing of the door at a time when an open switch has been operated to allow a car, object, or person to pass therethrough.

The control system described is particularly suitable for use in a place where, in addition to the normal open and close switches, a pull-chain operated switch is provided and is disposed to be operated by the driver of a vehicle desiring to pass through the door or closure opening. This is common in plants where lift and fork trucks carry material to and from a particular location and must pass through a door to arrive at their destination. Referring to FIG. 4, the operator of the vehicle may pull a chain 42 hanging in advance of the door and connected to one end of a rod supported in a casing 44 and urged upwardly by a spring 45. The rod may carry a cross bar 46 which, when moved downwardly against the bias of the spring, first actuates a switch 47 and then a switch 48.

The switch 47 may be connected in parallel with the "Open" switch 30 and the switch 48 is connected in parallel with the "Close" switch 37. When the switch 47 is closed, the OP relay coil will be energized to operate the door in an open direction, all as described above. It will be noted that the switch 47 will be closed each time the pull chain is pulled, but that this will have no effect if the door is open because of the fact that the relay coil OP will be short-circuited by the engagement of the lugs 25 with the leaf spring 26. If the door is open, the closing of the switch 48 will effect energization of the close relay coil C. If, however, the relay coil OP is energized, the closing of switch 48 to energize coil C will have no effect since the contacts OP-4, OP-5 in the power circuit in series with the close relay coil contacts C-2, C-3 are open rendering the closing of the contacts C-2, C-3 ineffective. If the door is closed when the switches 47, 48 are operated, the lug 25 will provide a short circuit about the relay coil C and this, in turn, would short-circuit the coil OP through the switch 48, the leaf spring 27, and the lug 25. To prevent such a short circuit, a resistor 49 is connected in series with the switch 48 and in parallel with the close switch 37. The voltage drop across the resistor 49 will be sufficient to provide a large enough voltage drop across the secondary of the coil 31 to maintain the open relay coil energized.

If the door is open when the chain is pulled, the lug 25 will prevent energization of the OP relay coil when the switch 47 is actuated and the actuation of switch 48 will then energize relay coil C to effect a closing of the door. It will be noted that the operation of switch 47 by bar 46 is momentary and that the switch 48 opens as shown as the chain 42 is released. The switch 47 is not closed by the return of the bar 44 because of the one-way construction of the switch operator.

A modification of the present invention is shown in FIG. 3. Referring to FIG. 3, the motor is shown as a single phase motor of the split-phase type having a run winding 50 having terminals 50a, 50b and a start winding 51. To start the motor, both the start winding and the run winding must be energized and the start winding is de-energized after the motor starts. To reverse the motor, both the start winding and the run winding must be energized with the direction of current in one of the windings being reversed from its direction before reversing. The motor is not shown in detail since such motors are conventional and commercially available. Generally, the motors have internal circuitry, not shown, to produce a phase shift in the flux of the start and run windings.

The low voltage control circuit for energizing the motor 17 in FIG. 3 is the same as the low voltage control circuit of FIG. 2 and the elements thereof have been given the same reference numerals as FIG. 2. The open and close relay coils, however, actuate various contacts in the circuits for energizing the start and run windings and the contacts in the circuit of FIG. 3 for energizing the motor 17 have been given the same reference characters as the relay coils which actuate the contacts, but with a number appended thereto with the appended numbers starting with the number 7 so as not to confuse the contacts in the power circuit of FIG. 3 with the contacts in the power circuit of FIG. 2. The relay coil OP of the circuit of FIG. 3, in addition to the normally open contacts OP-1 in parallel with the open switch 30, has normally open contacts OP-7 which connect terminal 50a of the run winding 50 to L2, normally open contacts OP-8 which connect terminal 50b of the run winding to one side of a start relay coil 53 having its other side connected to L1. In addition to the contacts OP-7, OP-8, the open relay coil OP has normally closed contacts OP-9, OP-10.

The close relay coil C has normally open contacts C-7 connected in series with the normally closed contacts OP-10 in a connection connected from L2 to the terminal 50b of the run winding 50, which is, as described above, connected to L1 through the contacts OP-8 and the start relay coil 53. In addition, the close relay coil C has normally open contacts C-8 which are connected in series with the normally closed contacts OP-9 in a connection connected to the terminal 50a of the run winding and to a junction between the contacts OP-8 and the start relay coil 53.

The start relay coil 53 has normally open contacts 53-1 in series with the start winding 51 and when the contacts 53-1 are closed, the start winding 51 is connected across L1, L2 with a first side of the start winding always being connected to L1 and the other side always being connected to L2. In the type of motor described, a current surge occurs in the run winding when the winding is connected to the power supply which is of greater magnitude than the magnitude of the current which flows after the motor starts. The start relay coil is a coil of a conventional type of relay which is actuated by a current of a magnitude greater than that which flows in the run winding after the motor starts but which is within the range of the current surge on starting. I have discovered that if, after the motor is operating, the connections of the run winding to L1 and L2 be interchanged, a current surge occurs which is larger than the current drawn by the run winding while the motor is operating and that the relay coil 53 can be made to be responsive to the current surge which occurs when the connections of the run winding are interchanged, as well as when the motor starts. Inasmuch as the start winding is always connected in the same relationship to L1 and L2, each interchange of the connections of the run winding to L1 and L2 will cause a reversal of the phase relationships of the currents in the start winding and run winding to reverse the direction of motor operation each time the connections are interchanged. In the illustrated embodiment, when the contacts operated by the relay coil OP are closed and the start winding energized, the phase relationship of the currents in the start and run windings are such as to operate the motor in a door opening direction, and when the contacts of relay coil C are made to energize the motor, the phase relationships are such as to operate the motor in a door closing direction.

From the foregoing, it can be seen that if open relay coil OP is energized, the contacts OP–7, OP–8 are closed to connect the terminal 50a of the run winding of L2 and the terminal 50b to L1 through the start relay coil 53. The surge of current by the closing of the contacts OP–7, OP–8 through the start relay coil 53 energizes the latter to close its normally open contacts 53–1 in series with the start winding 51. The closing of the contacts 53–1 connect the start winding 51 across L1, L2 to energize the latter. The energization of the run winding and the start winding will start the motor 17 to operate in an "Open" direction and as the motor comes up to speed, the start relay will be de-energized to de-energize the start winding 51.

It can also be seen that if the close relay coil C is energized, the closing of the contacts C–7, C–8 will reverse the connection of the terminals 50a, 50b of the motor 17 to L1, L2 to cause the current to flow in the opposite direction through the one run winding to effect operation of the motor in a close direction. The circuit completed by the closed contacts C–7, C–8 is through the normally closed contacts OP–9, OP–10 of the relay coil OP, so that if the OP relay coil is energized while the motor is operating in a close direction the energization of the motor through the contacts C–7, C–8 will be broken and the run winding 50 will be energized in the opposite direction by the closing of the contacts OP–7, OP–8. The energization of the OP relay will cause a current surge through the start relay 53 sufficient to energize the start winding 51 to cause the motor to start running in the opposite direction.

As previously pointed out, one of the advantages of the present invention is the flexibility of control provided by the circuits shown in FIGS. 2 and 3. In certain installations, it is desirable that a door be opened in response to the actuation of a switch device by a treadle or similar vehicle operated device and then automatically closed.

A control element or means which may be readily connected into the circuits of FIG. 2 or 3 to effect an automatic closing of the door, after the same has been opened is shown schematically in FIG. 3 and is designated generally by the reference numeral 55. The circuit of FIG. 3 shows a plug connection 54 comprising cooperating male and female plugs 54a, 54b. Wires 56, 57, 58 and 60 are connected to the male plug 54a and, in turn, when the plugs are mated, to wires 56a, 57a, 58a, 60a, respectively, connected to the female plug 54b. The wire 56a is connected to the terminal 28 of the transformer 32, the wire 57a is connected to the terminal 29 of the transformer 32, the wire 58a is connected to a junction 62 in the connection between the open switch 30 and the open relay coil OP, and the wire 60a is connected to the connection between the close switch 37 and the coil C at a junction 61, indicated in FIG. 2. The above-described connections are such that wires 56 and 57 provide the L1, L2 sides of a low voltage power supply for the element 55. A switch device 59 interconnects the wires 58, 56 and when it is closed, as by a vehicle running over a treadle, the switch 59 connects the wire 56, which may be considered as L1, to the wire 58 to energize the coil OP to open the door in the manner previously described. The wire 58 is also connected to one contact 64 of a double pole, double throw relay 65 having switch arms 66, 67 and a relay coil 68. The switch arm 66 is moved from engagement with the contact 64 to engagement with a contact 69 connected to the wires 56, i.e., L1, and the switch arm 67 is moved from its engagement with a contact 70 to engagement with a contact 71 when the relay coil is energized. The relay coil 68 has one side connected to the switch arm 66 and its other side connected by a thermostatic switch device 72 to the wire 57, which may be considered as L2. The thermostatic switch device 72 includes a heating element 73 having one end connected to the switch arm 66 and the other end connected to a temperature responsive contact arm 74a which is connected to wire 57 and which cooperates with a contact 74b connected to the coil 68. The contacts 74a, 74b are broken when the arm 74a is heated to a predetermined temperature to break the connection of the relay coil 68 to L2.

The closing of the switch device 59 causes the double pole, double throw relay coil 68 to be energized through the contact 64 and the switch arm 66. The energization of the coil 68 actuates the arm 66, 67 into engagement with the contacts 69, 71, respectively. The engagement of the arm 66 with the contact 69 maintains the relay coil 68 energized, while the engagement of the switch arm 67 with the contact 71 connects one side of a relay coil 77 of a single pole, double throw relay 78 to the line 57, i.e., L2. The other side of the single pole, double throw relay coil 77 is connected to the wire 56, i.e., L1 through a contact 80a and movable switch arm 80b of a timer 81 including a timer motor 82. The single pole, double throw relay coil 77 is energized when the switch arm 67 of relay 65 engages the contact 71, and the relay coil 77 actuates a switch arm 83 from a position in engagement with a contact 84 to a position in engagement with a contact 85. The contact 85 is connected to the wire 57, i.e., L2, and maintains the relay 78 energized as long as the timer contact 80a and arm 80b complete a circuit thereto to L1.

As explained above, the thermostatic switch device 72 functions to break the circuit for energizing the relay 65 a predetermined time after the relay coil 68 is energized and when the relay 65 is de-energized, the switch arms 66, 67 return to their positions in engagement with the contacts 64, 70, respectively. When the switch arm 67 engages contact 70 with relay 78 energized, a circuit is completed for energizing the timer motor 82. The timer motor has one side connected to the wire 56 through the timer contact 80a and arm 80b and its other side connected to the contact 70 so that when the switch arm 67 is in engagement with the contact 70 and the switch arm 83 of the relay 78 in engagement with the contact 85, the timer motor 82 is connected across the wires 56, 57, i.e., across L1, L2, to energize the latter. The timer motor operates to move the timer switch arm 80b from contact 80a and into engagement with a contact 86 after it runs for a predetermined period. The movement of the timer arm 80b into contact with the contact 86 effects de-energization of the timer motor by breaking the energized circuit through arm 80b to disconnect it from the wire 56, i.e., L1, and the timer motor will reset itself. The engagement of the switch arm 80b with the contact 86 connects the wire 56 to the wire 60 to apply L1 to the contact and this is the same as depressing the close switch 37 to energize the coil C to effect a closing of the door.

When the timer resets itself and the timer switch arm 80b moves back into contact with the contact 80a, the timer motor 82 will not be re-energized since the relay 78 was de-energized by the initial movement of the timer switch arm 80b to break the circuit from the wire 56 to the relay coil 77 and timer motor 80. The cycle of the timer is such as to allow the door to open and the passage of a vehicle therethrough before timer arm 80b initiates the closing of the door.

The thermostatic delay device 72 is provided to assure that the timer motor will have sufficient time to reset itself each time the switch device 59 is actuated. If a first vehicle operates the switch device 59 to open the door and is proceeding through the door before it has fully opened or as it reaches the top of its position and a second vehicle operates to depress the switch device 59, it is desirable that the automatic closing of the door be delayed for the full cycle. The delay of the thermostatic switch device 72 is such as to permit the timer motor to reset itself each time it is de-energized. If the timer motor is operating as a result of a first closing of the switch 59 but has not run its cycle, a second closing of the switch 59 will effect energization of the relay 65 which will, in turn, effect de-energization of the timer motor by moving the switch arm 67 out of engagement with the contact 70 and into engagement with the contact 71. Upon the de-energization of the timer motor, it will reset to its initial position and the relay 65 will be maintained energized by the device 72 for a length of time sufficient to accomplish the resetting. After this period of time passes, the relay 65 will be de-energized by the device 72, the switch arm 67 moved back into engagement with the contact 70 to reinitiate the timing operation of the motor 82.

It is not believed necessary to describe the timer 81 since it may be of a conventional construction and may comprise an electric motor which drives a shaft which is spring biased in one direction to an initial position by a torsion spring. The motor when energized may operate in a direction opposite to the direction in which the spring operates to further tension the spring as the motor rotates, and the shaft may carry a switch element which remains in engagement with a first contact along the side of the shaft for a predetermined portion of its movement and then loses engagement with this contact and engages the second contact 86. The motor armature may be connected directly to the shaft or may be connected thereto through reduction gearing of the type which will allow the return of the shaft under the action of the spring.

It can be seen that the control element for automatically closing the door at a predetermined time after the door has been opened can be readily connected into the control circuits of FIGS. 2 and 3. Furthermore, it will be noted that the control element is automatically set into operation each time a switch is operated to open the door and all of the connections for the element are low voltage connections. For the sake of convenience, the operators can be provided with the plug connection 54 so that the control element 55 can be easily added to the operator at any time after installation. It is readily apparent that the control device shown in FIG. 3 may also readily be set up with a male plug adapted to mate with the female plug on the operator so that either the delay control element or the control element of FIG. 4 may be readily added to the circuit at the user's option. For each of the control elements, the connections into the circuits are to be made at the same points. While the control element of FIG. 4 does not require an equivalent of the wire 57, the plug in the case of the element of FIG. 4 could include a dummy prong of insulating material which failed to make electrical connection or the prong could be omitted.

In view of the foregoing, it can be seen that the present invention provides a new and an improved simplified way of reversing the direction of a motor, particularly a motor for controlling a closure.

While the preferred embodiment of the present invention has been described in considerable detail, it is hereby my intention to cover all constructions, modifications, and arrangements which fall within the ability of those skilled in the art and the scope and the spirit of the present invention.

Having thus described my invention, what I claim is:

1. In a control system for effecting the reciprocation of a closure member between open and closed limit positions including a reversible motor operatively connected to drive said member, control means for said motor including a first coil energizable to effect operation of said motor in one direction to move said member to its open position and a second coil energizable to effect operation of said motor in its other direction to move said member to its closed position, a power supply, a circuit for energizing said first coil including a first switch selectively actuatable to an actuated position to connect said first coil across said power supply to effect energization of the coil, self-holding means responsive to the energization of said first coil to maintain the coil energized independently of said switch and rendered ineffective upon the de-energization of the coil, a second switch and an impedance connected in series with said second coil and across said power supply, said second switch having an actuated position for energizing said second coil, self-holding means responsive to the energization of said second coil to maintain the coil energized independently of said second switch and rendered ineffective upon the de-energization of the coil, first and second short-circuiting means for effectively short-circuiting said first and second coils respectively to de-energize the latter in response to the movement of said member to its said open and closed positions respectively, said impedance having a magnitude such that the voltage drop across said impedance is sufficient to maintain said first coil energized when the said second switch is actuated and said second short-circuiting means is short-circuiting said second coil, and means actuatable from a first position to a second position to actuate said first switch and said second switch in the sequence named.

2. In a control system for effecting the reciprocation of a closure member between open and closed positions including a reversible motor operatively connected to said member, control means for said motor including a first relay coil energizable to effect operation of said motor in one direction to move said member to its open position and a second relay coil energizable to effect operation of said motor in its other direction to move said member to its closed position, a power supply, a first switch selectively actuatable to an actuated position to connect said first relay coil to said power supply to effect energization of the relay coil, self-holding means responsive to the energization of said first relay coil to maintain the coil energized independently of said first switch and rendered ineffective upon the de-energization of the coil, a circuit for selectively effecting energization of said second coil including a second switch and an impedance connected in series with said second coil across said power supply, self-holding means responsive to the energization of said second relay coil to maintain the coil energized independently of said second switch and rendered ineffective upon the de-energization of the coil, the voltage drop across said impedance being sufficient to maintain said first coil energized when said second means is short-circuiting said second coil and said second switch is actuated, and means actuatable from a first position to a second position to operate said switches in sequence.

3. In a control system for effecting the reciprocation of a closure member between open and closed positions including a reversible motor operatively connected to said member, control means for said motor including a first relay coil energizable to effect operation of said motor in one direction to move said member to its open position and a second relay coil energizable to effect operation of said motor in its other direction to move said member to its closed position, a power supply, first switch selectively actuatable to an actuated position to connect said first relay coil to said power supply to effect energization of the relay coil, self-holding means responsive to the energization of said first relay coil to maintain the coil energized independently of said first switch and rendered ineffective upon the de-energization of the coil, a circuit for selectively effecting energization of said second coil including a second switch, self-holding means responsive to the energization of said second relay coil to maintain the coil energized independently of said second switch and rendered ineffective upon the de-energization of the coil, first and second short-circuiting means for effectively short-circuiting said first and second coils respectively to de-energize the latter in response to the movement of said member to its said open and closed positions respectively, contact means having an actuated position rendering the actuation of said second switch ineffective to effect operation of said motor and actuated to said actuated position in response to the energization of said coil, a timing device energizable to initiate a timing operation and connected to energize said second relay coil upon the completion of the timing operation, circuit means for energizing said timing device including control means having conditions rendering said circuit means effective and ineffective and energizable to render said circuit means effective, and second circuit means connecting said first switch to energize said control means on actuation of said first switch to energize said first relay coil.

4. In a closure operating mechanism, a first control element energizable to operate the closure in a first direction, a second control element energizable to operate the closure in a second direction opposite to said first direction, a switch device selectively actuatable to effect energization of said first control element, a timing device energizable to operate the device from an initial position to initiate a timing operation and connected to energize said second control element at a predetermined time period after the start of said timing operation, circuit means for energizing said timing device including a first relay having an energized position for completing a first circuit for energizing said timing device and said first relay, second relay means having an energized position effective to energize said first relay and render said first circuit ineffective to energize said timing device and a de-energized position rendering said first circuit effective to energize said timing device, second circuit means connecting said switch device to said second relay means to energize the latter upon operation of the switch device to energize said first control element, said second circuit means including time delay means responsive to the energization of said second relay means for effecting de-energization of said second relay means through said second circuit means a predetermined time period after energization, said timing device including means responsive to the completion of the timing period by the timing device for energizing said second control element and de-energizing said first relay and means for resetting said timing device upon the de-energization thereof.

5. In a control system for effecting the reciprocation of a closure member between open and closed positions including a reversible motor operatively connected to said member, control means for said motor including a first relay coil energizable to effect operation of said motor in one direction to move said member to its open position and a second relay coil energizable to effect operation of said motor in its other direction to move said member to its closed position, a power supply, a first switch selectively actuatable to an actuated position to connect said first relay coil to said power supply to effect energization of the relay coil, self-holding means responsive to the energization of said first relay coil to maintain the coil energized independently of said first switch and rendered ineffective upon the de-energization of the coil, a circuit for selectively effecting energization of said second coil including a second switch, self-holding means responsive to the energization of said second relay coil for making a circuit to maintain the coil energized independently of said second switch and rendered ineffective upon the de-energization of the coil, first and second switch means responsive to the movement of said member to said open and closed positions respectively for effecting the de-energization of said coils, a third relay coil having normally open contacts effective to energize said first relay coil when closed, parallel circuit means connecting said third relay coil in parallel circuit with said second relay coil and in circuit to be controlled by said self-holding means for said second relay coil, said parallel circuit means including means normally breaking said parallel circuit and actuated in response to the closure member meeting an obstruction to make said parallel circuit means, and contact means having an actuated position rendering the actuation of said second switch ineffective to effect operation of said motor and actuated to said actuated position in response to the energization of said first relay coil.

6. In a control system for effecting the reciprocation of a closure member between open and closed positions including a reversible motor operatively connected to said member and having a run winding and a start winding and reversible by interchanging the connection of one of said windings to the power supply, first switch means in circuit with said run winding to connect the respective sides of said run winding to certain sides of said power supply to effect operation of said motor in a direction to open said closure member, second switch means in circuit with said run winding and effective to connect the respective sides of said run winding to different sides of said power supply from said first switch means, a start relay connected in circuit with said run winding and energized by the current flowing in said run winding, normally open contacts actuated by said start relay in circuit with said start winding for connecting the respective sides of said start winding to the respective sides of said power supply when said start relay is energized, said start relay being de-energized for currents of magnitudes corresponding to the magnitude of the normal operating current in said run winding, control means for said motor including first and second relay coils respectively energizable to effect actuation of said first and second switch means respectively, a first switch selectively actuatable to an actuated position to connect said first relay coil to said power supply to effect energization of the relay coil, self-holding means responsive to the energization of said first relay coil to maintain the coil energized independently of said first switch and rendered ineffective upon the de-energization of the coil, a circuit for selectively effecting energization of said second coil including a second switch, self-holding means responsive to the energization of said second relay coil for making a circuit to maintain the coil energized independently of said second switch and rendered ineffective upon the de-energization of the coil, first and second contact means responsive to the movement of said member to said open and closed positions respectively for effecting the de-energization of said coils, a third relay coil having normally open contacts effective to energize said first relay coil when closed, parallel circuit means connecting said third relay coil in parallel with said second relay coil and in circuit to be controlled by said self-holding means for said second relay coil, said parallel circuit means including means normally breaking said parallel circuit and actuated in response to the door meeting an obstruction to make said parallel circuit means, and contact means having an actuated position rendering the actuation of said second switch ineffective to effect operation of said motor and actuated to said actuated position in response to the energization of said first relay coil.

7. In a control system for effecting the reciprocation of a member between limit positions including a reversible motor operatively connected to drive said member between said positions, control means for said motor including a first relay coil energizable to effect operation of said motor in one direction to a first one of said positions and a second relay coil energizable to effect operation of said motor in its other direction to the second one of said positions, a power supply, a first switch selectively actuatable to an actuated position to connect said first coil to said power supply to effect energization of the coil, self-holding means actuated in response to the energization of said first coil to maintain the coil energized independently of said first switch and rendered ineffective upon the de-energization of the coil, a circuit for selectively energizing said second coil including a second switch actuatable to connect said second coil to said power supply, second self-holding means responsive to the energization of said second coil to maintain the coil energized independently of said second switch and rendered ineffective upon the de-energization of the coil, first and second short-circuiting means for effectively short-circuiting said first and second coils respectively to de-energize the latter in response to the movement of said member to said first and second ones respectively of said limit positions, a stop switch, a means connecting said stop switch across said power supply for short-circuiting said power supply upon the closing of said stop switch, a third relay coil, and circuit means connecting said third coil across said second relay coil whereby said third relay coil is energizable when said second relay coil is energized, said circuit means connecting said third relay coil across said second relay coil including means responsive to said member meeting an obstruction in its closing movement for completing the circuit across said second relay coil to effect energization of said third relay coil, and contact means actuated in response to the actuation of said third relay coil for energizing said first relay coil.

8. In a control system for effecting the reciprocation of a closure member between open and closed positions including a reversible motor operatively connected to said member to move the latter in opposite directions upon operation of the motor in opposite directions, control means for said motor including a first relay coil energizable to effect operation of said motor in one direction to move said member to its open position and a second relay coil energizable to effect operation of said motor in its other direction to move said member to its closed position, a power supply, a first switch selectively actuatable to an actuated position to connect said first relay coil to said power supply to effect energization of the relay coil, self-holding means responsive to the energization of said first relay coil to maintain the coil energized independently of said first switch and rendered ineffective upon the de-energization of the coil, a circuit for selectively energizing said second coil including a second switch, self-holding means responsive to the energization of said second relay coil for making a circuit to maintain the coil energized independently of said second switch and rendered ineffective to energize said second relay coil upon the de-energization of the coil, first and second switch means responsive to the movement of said member to said open and closed positions respectively for effecting the de-energization of said coils, parallel circuit means effective when energized to effect the energization of said first coil and connected in parallel circuit with said second relay coil and in circuit to be controlled by said holding means for said second relay coil whereby said parallel circuit means is de-energized when said second relay coil is de-energized, said parallel circuit means including means normally breaking said parallel circuit and actuated in response to the closure member meeting an obstruction to make said parallel circuit means and effect energization of said first relay coil, and contact means having an actuated position rendering the actuation of said second switch ineffective to effect operation of said motor and actuated to said actuated position in response to the energization of said first relay coil.

9. In a control system as defined in claim 8 wherein said parallel circuit means comprises an uninsulated conductor adjacent the path of said member and connected by said parallel circuit means to said power supply whereby said conductor has power applied thereto when said self-holding means for said second relay coil is effective, and means responsive to the closure member meeting an obstruction to engage and connect the conductor to the other side of the power supply.

10. In a control system for effecting the reciprocation of a member between limit positions including a reversible motor operatively connected to drive said member between said positions, control means for said motor including a first relay coil energizable to establish connections to said motor to operate said motor in one direction to move said member to a first one of said positions and a second relay coil energizable to establish connections to said motor to effect operation of said motor in its other direction to move said member to the second one of its positions and to break the connections to said motor established by said first coil, a power supply, a first switch selectively actuatable to an actuated position to connect said first coil across said power supply to effect energization of the coil, first self-holding means actuated in response to the energization of said first coil to maintain the coil energized independently of said first switch and rendered ineffective upon the de-energization of the coil, a circuit for selectively effecting energization of said second coil including a second switch, second self-holding means responsive to the energization of said second coil to maintain the coil energized independently of said second switch and rendered ineffective upon a de-energization of the coil, first short circuiting means for effectively short-circuiting said first coil in response to the movement of the member to said first one of said limit positions and connected to said power supply through said self-holding means whereby the current in said short-circuiting means is broken upon the de-energization of said first coil, second short-circuiting means for effectively short-circuiting said first and second coils upon movement of said member to said second limit positions to de-energize said coils and connected to said power supply through said second self-holding means whereby said second short-circuiting means is de-energized upon the de-energization of said second relay coil, and reversing means effective when said first relay coil is energized to energize said second coil upno the closure member meeting an obstruction while the motor is being operated in said one direction.

References Cited by the Examiner
UNITED STATES PATENTS

| | | | |
|---|---|---|---|
| 2,231,174 | 2/41 | Trogner | 317—147 X |
| 2,262,650 | 11/41 | Reagan et al. | 317—154 X |
| 2,425,312 | 8/47 | Gower | 318—267 |
| 2,428,403 | 10/47 | Yardeny | 318—467 |
| 2,558,032 | 1/51 | Andrews | 318—266 |
| 2,583,662 | 1/52 | Noble | 318—266 |
| 2,643,357 | 6/53 | Clark | 318—207 |
| 2,674,710 | 4/54 | Pitman | 318—207 |
| 2,804,582 | 8/57 | Guth et al. | 318—207.1 |
| 3,048,756 | 8/62 | Voege | 318—207 |

ORIS L. RADER, *Primary Examiner.*

MILTON O. HIRSHFIELD, *Examiner.*